United States Patent
Owashi

[11] Patent Number: 5,915,140
[45] Date of Patent: Jun. 22, 1999

[54] CAMERA

[75] Inventor: Masao Owashi, Yokohama, Japan

[73] Assignee: Nikon Corporation, Tokyo, Japan

[21] Appl. No.: 09/012,550

[22] Filed: Jan. 23, 1998

[30] Foreign Application Priority Data

Jan. 27, 1997 [JP] Japan .................................. 9-012448

[51] Int. Cl.⁶ .................................................. G03B 17/00
[52] U.S. Cl. ........................................... 396/448; 396/538
[58] Field of Search .................................... 396/348, 349, 396/350, 448, 535, 536, 538

[56] References Cited

U.S. PATENT DOCUMENTS

| | | | |
|---|---|---|---|
| 4,557,574 | 12/1985 | Kohno et al. ........................... | 396/448 |
| 5,317,356 | 5/1994 | Dassero .................................... | 396/538 |
| 5,819,127 | 10/1998 | Yokota ................................ | 396/448 X |
| 5,822,638 | 10/1998 | Yoshida et al. .......................... | 396/448 |

Primary Examiner—Howard B. Blankenship

[57] ABSTRACT

A camera has a camera body, a sliding cover disposed on the front face of the camera body and movable between a position in which it covers a photo-taking lens and a position in which it does not cover the photo-taking lens, a film cartridge chamber which opens on a side of the camera body which is parallel to the direction of movement of the sliding cover and into and out of which a film cartridge is put through the opening, and a cartridge chamber lid for openably and closably covering the opening in the film cartridge chamber. A guide structure for guiding the sliding cover when the sliding cover is in the position in which it does not cover the photo-taking lens is provided on the outer surface of the cartridge chamber lid. In another mode, an opening preventing portion for preventing the cartridge chamber lid from being opened when the sliding cover is in the position in which it does not cover the photo-taking lens is provided on the sliding cover.

7 Claims, 12 Drawing Sheets

5,915,140

1

CAMERA

The entire disclosure of Japanese Patent Application No. 9-012448 including specification, claims, drawings and summary is incorporated herein by reference in its entirety.

BACKGROUND OF THE INVENTION

1. Field of the Invention

This invention relates to a camera, and particularly to a camera having a sliding cover for covering a photo-taking lens disposed on the front face of a camera body.

2. Related Background Art

There is known a camera such as a compact camera having a sliding cover for covering a photo-taking lens disposed on the front face of a camera body.

FIGS. 10 to 12 of the accompanying drawings show a camera of this kind according to the prior art, and in this camera, a sliding cover 3 for covering a photo-taking lens 2 is disposed on the front face of a camera body 1.

This sliding cover 3 is guided along guide grooves la formed in the upper surface and lower surface of the camera body 1, and is made movable along the front face between a position in which it covers the photo-taking lens 2 and a position in which it does not cover the photo-taking lens 2.

The opening portion 5a of a film cartridge chamber 5 through which a film cartridge 4 is put in and out is formed in the lower surface of the camera body 1, and this opening portion 5a is openably and closably covered with a cartridge chamber lid 6.

FIG. 13 of the accompanying drawings shows an opening-closing mechanism for the cartridge chamber lid 6, and a fixed portion 6a is formed along the end portion of the cartridge chamber lid 6.

This fixed portion 6a is formed with an open groove 6b, and a restraining groove 6c is formed at the bottom toward the sideways portion of the open groove 6b. The engagement tab 7a of an opening-closing lever 7 is engaged with the restraining groove 6c. An operating member 7b shown in FIG. 10 is integrally formed on that side of the opening-closing lever 7 which is opposite to the engagement tab 7a. The opening-closing lever 7 is biased toward the bottom surface side of the restraining groove 6c by a coil spring 8.

A lock member 9 bears against that side of the opening-closing lever 7 which is opposite to the coil spring 8. This lock member 9 is formed with a rack 9a and is vertically movable by a motor 12 through gears 10 and 11.

In the above-described camera, during the use of the camera, as shown in FIG. 13, the movement of the opening-closing lever 7 by the operating member 7b is impeded by the lock member 9, and the restraining tab 7a of the opening-closing lever 7 is restrained by the restraining groove 6c of the cartridge chamber lid 6, whereby the cartridge chamber lid 6 is prevented from being opened.

On the other hand, during the non-use of the camera, the lock member 9 is downwardly moved by the rotation of the motor 12 and the movement of the opening-closing lever 7 by the operating member 7b becomes possible, and the restraining tab 7a of the opening-closing lever 7 is positioned in the open groove 6b of the cartridge chamber lid 6, whereby the opening of the cartridge chamber lid 6 becomes possible.

In the camera according to the prior art, however, the lock member 9 is moved by the driving of the motor 12 to thereby prevent the cartridge chamber lid 6 from being opened during the use of the camera, and this has led to the problem that the opening-closing mechanism for the cartridge chamber lid 6 becomes very much complicated.

Besides the above-described opening-closing mechanism, there is conceivable a mechanism for effecting the opening and closing of the cartridge chamber lid itself by the driving of a motor and preventing the cartridge chamber lid from being opening during the use of the camera by software-like control, but again in this case, there is the problem that the opening-closing mechanism for the cartridge chamber lid becomes very much complicated.

SUMMARY OF THE INVENTION

The present invention has been made in order to solve such problems peculiar to the prior art and the object thereof is to provide a camera capable of reliably preventing a cartridge chamber lid from being opened during the use of the camera by simple structure.

A camera according to one mode of the present invention has a sliding cover disposed on the front face of a camera body and movable along the front face between a position in which it covers a photo-taking lens and a position in which it does not cover the photo-taking lens, a film cartridge chamber which opens on a side of the camera body which is parallel to the direction of movement of the sliding cover and into and out of which a film cartridge is put through the opening in the side, a cartridge chamber lid for openably and closably covering the opening of the film cartridge chamber, and a guide groove or a guide convex portion formed on the cartridge chamber lid for guiding the sliding cover when the sliding cover is in the position in which it does not cover the photo-taking lens. In this camera, only when the sliding cover is in the position in which it does not cover the photo-taking lens, the sliding cover is guided by the guide groove or the guide convex portion formed on the cartridge chamber lid, and the opening of the cartridge chamber lid is impeded by the sliding cover.

In this camera, guide grooves or guide convex portions may be formed straight in both sides of the camera body which are parallel to the direction of movement of the sliding cover and also, the guide groove or the guide convex portion on the cartridge chamber lid may be formed at a location on the extension of (i.e. in line with) the guide groove or the guide convex portion formed in the side of the cartridge chamber lid.

A camera according to another mode of the present invention has a sliding cover disposed on the front face of a camera body and movable along the front face between a position in which it covers a photo-taking lens and a position in which it does not cover the photo-taking lens, a film cartridge chamber which opens on a side of the camera body which is parallel to the direction of movement of the sliding cover and into and out of which a film cartridge is put through the opening in the side, a cartridge chamber lid for openably and closably covering the opening of the film cartridge chamber, and an opening impeding portion formed on the sliding cover for impeding the opening of the cartridge chamber lid when the sliding cover is in the position in which it does not cover the photo-taking lens. In this camera, only when the sliding cover is in the position in which it does not cover the photo-taking lens, the cartridge chamber lid is prevented by the opening impeding portion of the sliding cover from being opened. In this camera, the opening impeding portion may be integrally formed on the end portion of the sliding cover so as to cover at least a portion of the cartridge chamber lid.

A camera according to still another mode of the present invention has a sliding cover disposed on the front face of a camera body and movable along the front face between a position in which it covers a photo-taking lens and a position in which it does not cover the photo-taking position, a film cartridge chamber which opens on a side of the camera body which is parallel to the direction of movement of the sliding cover and into and out of which a film cartridge is put through the opening in the side, a cartridge chamber lid for openably and closably covering the opening of the film cartridge chamber, and an opening operation impeding portion formed on the sliding cover for impeding the opening operation of an operating member for effecting the opening and closing of the cartridge chamber lid when the sliding cover is in the position in which it does not cover the photo-taking lens. In this camera, only when the sliding cover is in the position in which it does not cover the photo-taking lens, the opening operation of the operating member is impeded by the opening operation impeding portion of the sliding cover, whereby the opening of the cartridge chamber lid is impeded.

In this camera, the opening operation impeding portion may be integrally formed on the end portion of the sliding cover such that it covers at least a portion of the operating member.

DESCRIPTION OF THE PREFERRED EMBODIMENTS

Figure 1:
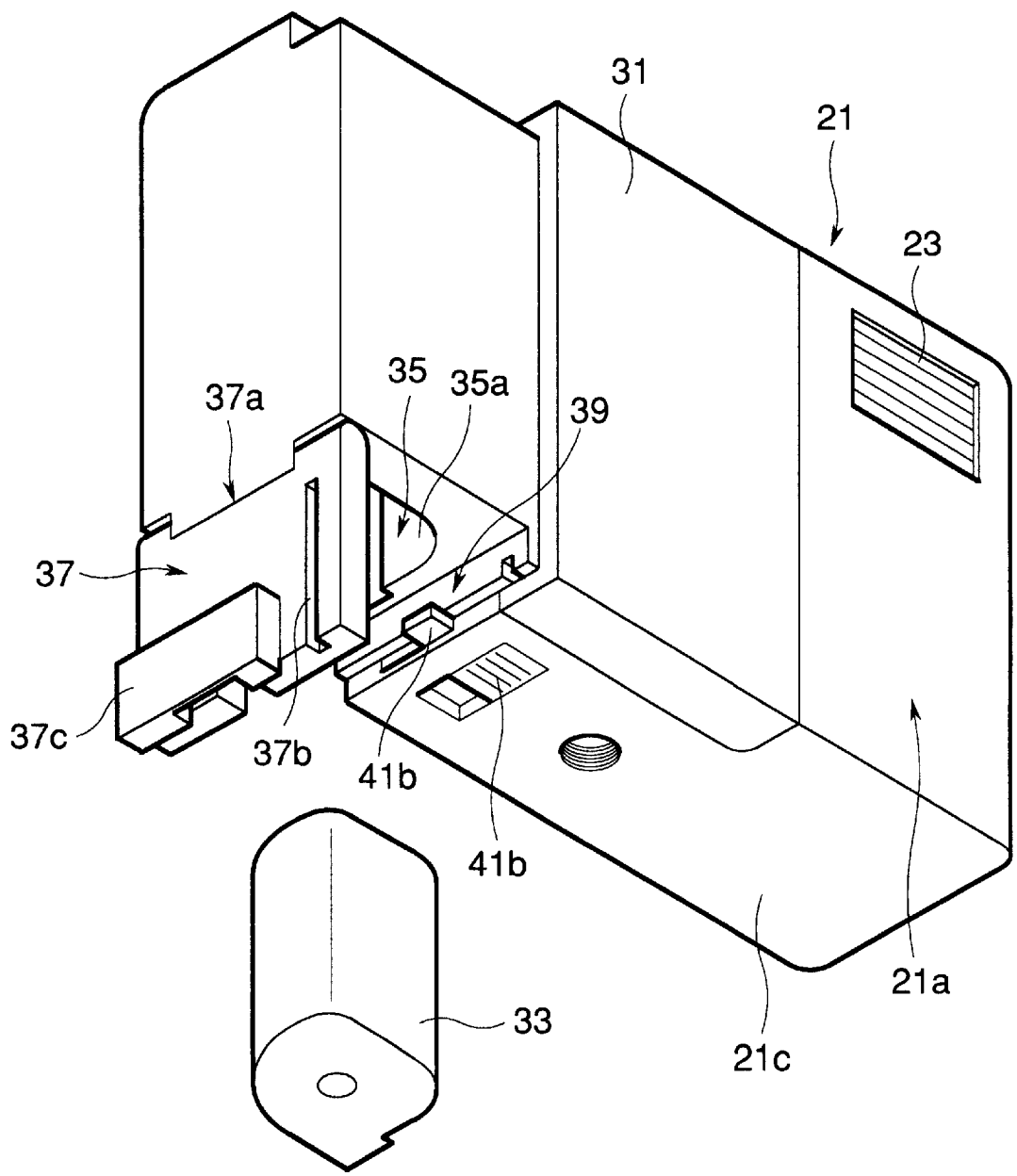
FIG. 1 is a perspective view showing a state in which a cartridge chamber lid is opened in a first embodiment of the camera of the present invention.

Some embodiments of the present invention will hereinafter be described with reference to the drawings.

Referring to FIGS. 1 to 4 which show a first embodiment of the camera of the present invention, the reference numeral 21 designates a rectangular parallelepiped camera body.

A flash 23 is disposed at a corner of the upper portion of the front face 21a of the camera body 21. Also, a phototaking lens 25 is disposed at the center of the front face 21a of the camera body 21. This photo-taking lens 25 is comprised of a lens 29 contained in a lens barrel 27.

Figure 4:
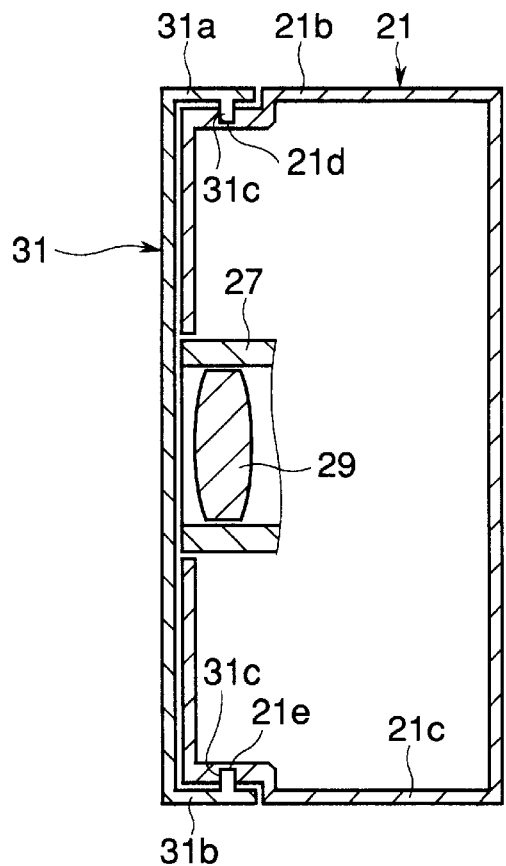
FIG. 4 is a cross-sectional view showing the lens barrel portion of the camera of FIG. 1.

A sliding cover 31 for covering the photo-taking lens 25 is disposed on the front face 21a of the camera body 21. This sliding cover 31 is formed, for example, of resin and as shown in FIG. 4, protruding portions 31a and 31b protruding onto the upper surface 21b and lower surface 21c, respectively, of the camera body 21 are integrally formed at the upper and lower ends thereof.

Linear guide convex portions 31c are integrally formed on the inner surfaces of the protruding portions 31a and 31b. These guide convex portions 31c are inserted in linear guide grooves 21d and 21e formed along the upper surface 21b and lower surface 21c, respectively, of the camera body 21.

An opening portion 35a of a film cartridge chamber 35 through which a film cartridge 33 is put in and out is formed on the lower surface 21c of the camera body 21. This opening portion 35a is openably and closably covered with a cartridge chamber lid 37.

The outer side of the cartridge chamber lid 37 is pivotably joined to the camera body 21 by a hinge 37a, and the inner side thereof is openable and closable by an opening-closing mechanism 39 which will be described later.

In this embodiment, the cartridge chamber lid 37 is formed with a guide groove 37b for guiding the guide convex portion 31c of the sliding cover 31.

This guide groove 37b is formed at a location on the extension of the guide groove 21e formed in the lower surface 21c of the camera body (i.e., so as to be on a straight line with respect to the guide groove 21e).

Figure 5:
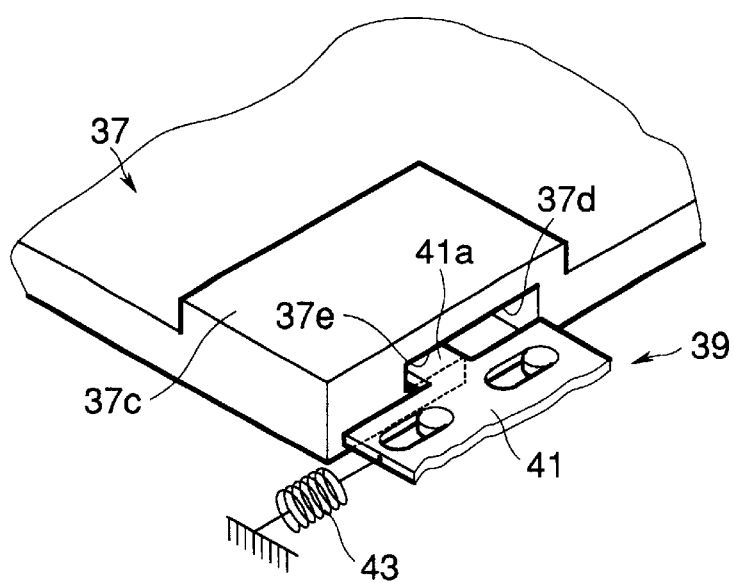
FIG. 5 is a perspective view schematically showing an opening-closing mechanism for the cartridge chamber lid of the camera of FIG. 1.

FIG. 5 shows the details of the opening-closing mechanism 39 for the cartridge chamber lid 37, and a fixed portion 37c is formed along the end portion of the cartridge chamber lid 37. This fixed portion 37c is formed with an open groove 37d, and a restraining groove 37e is formed at the bottom toward the sideways portion of the open groove 37d.

An engagement tab 41a of an opening-closing lever 41 is engaged with the restraining groove 37e. An operating member 41b shown in FIG. 1 is integrally formed on that side of the opening-closing lever 41 which is opposite to the engagement tab 41a.

The opening-closing lever 41 is biased toward the bottom of the restraining groove 37e by a coil spring 43.

Figure 3:
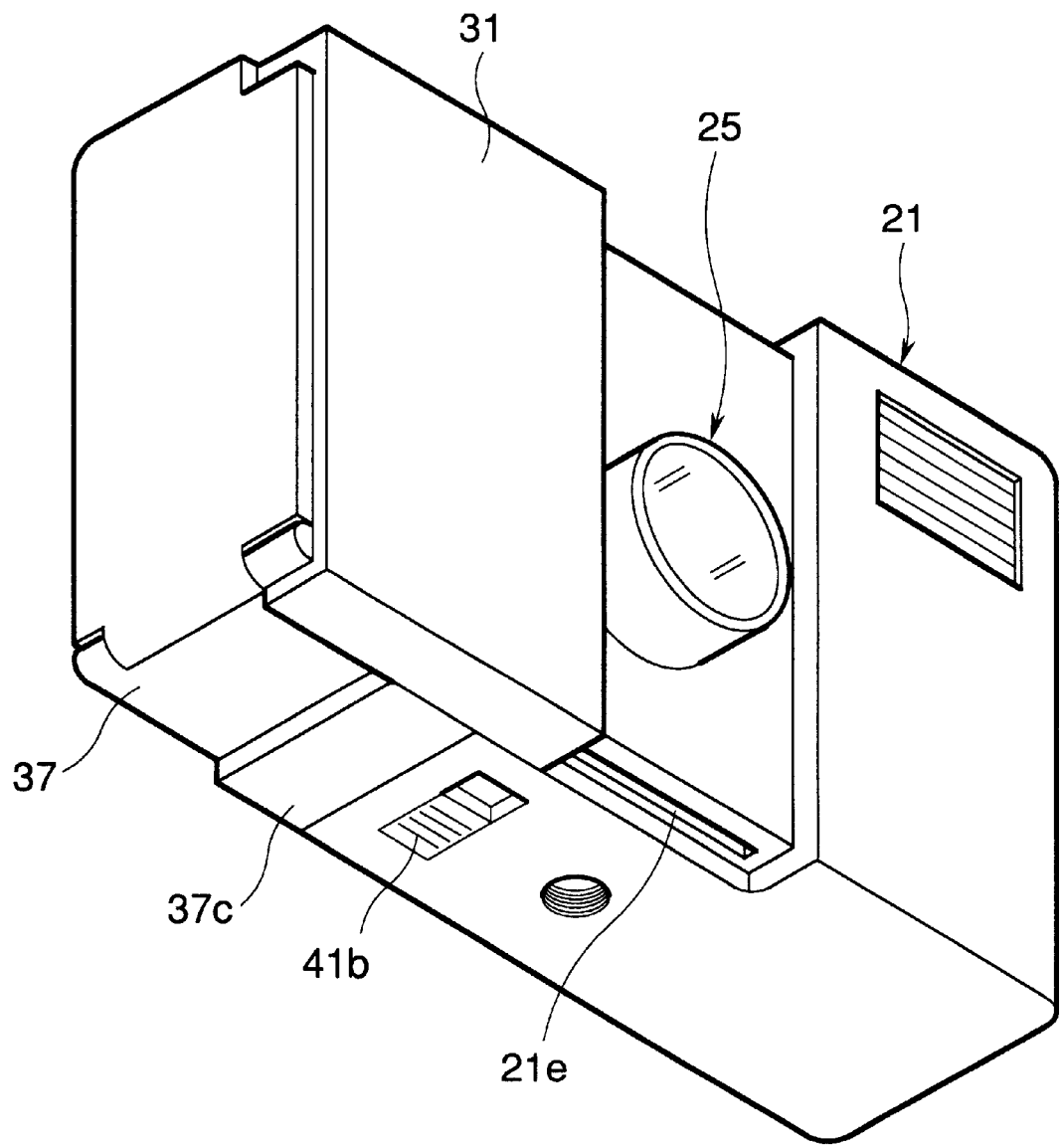
FIG. 3 is a perspective view showing a state in which the sliding cover is opened in the camera of FIG. 1.

In the above-described camera, during the use of the camera, as shown in FIG. 3, the sliding cover 31 is guided by the guide groove 37b formed in the cartridge chamber lid 37, and the opening of the cartridge chamber lid 37 is impeded by the sliding cover 31.

Figure 2:
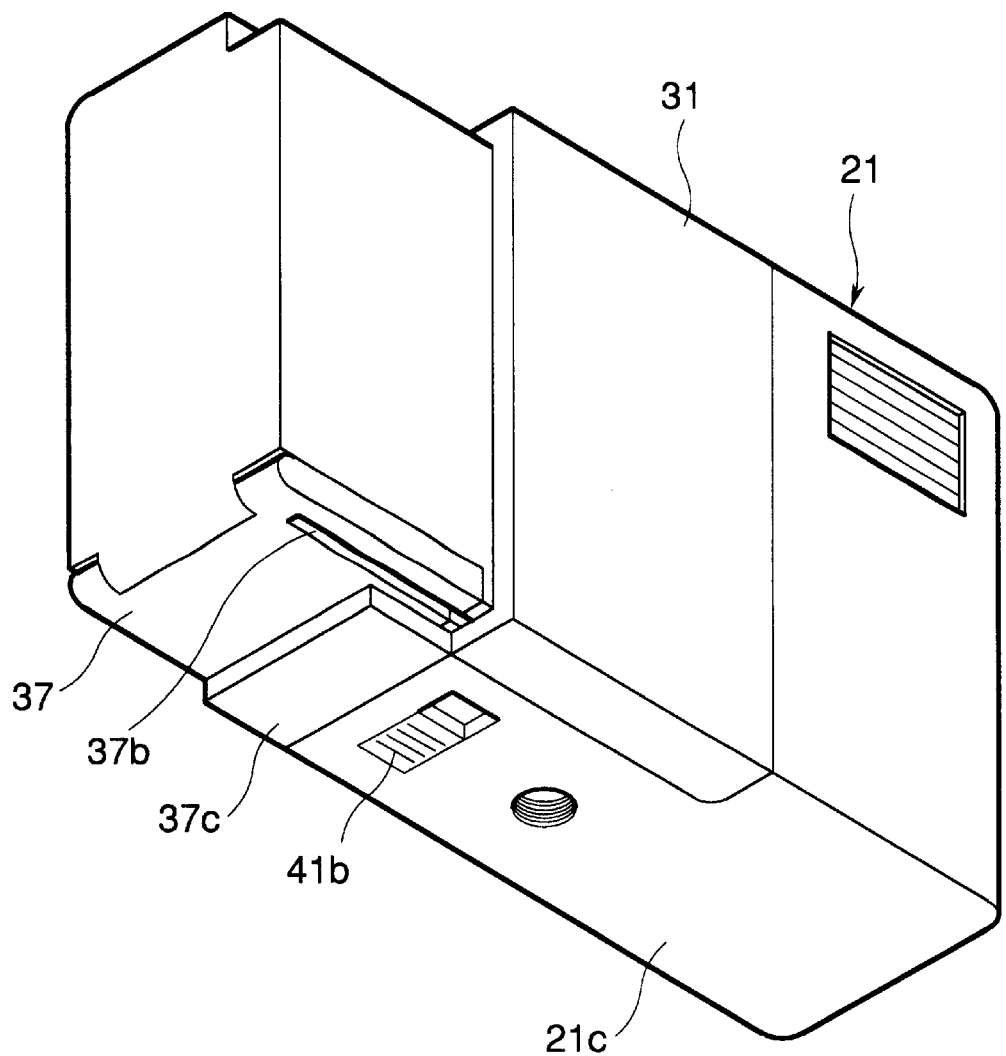
FIG. 2 is a perspective view showing a state in which a sliding cover is closed in the camera of FIG. 1.

On the other hand, during the non-use of the camera, as shown in FIG. 2, the sliding cover 31 is moved to a position off the guide groove 37b of the cartridge chamber lid 37, and by operating the operating member 41b of the opening-closing lever 41 to position the engagement tab 41a in the open groove 37d of the cartridge chamber lid 37, the opening of the cartridge chamber lid 37 becomes possible.

In the camera constructed as described above, the cartridge chamber lid 37 is formed with the guide groove 37b for guiding the sliding cover 31 when the sliding cover 31 is in a position in which it does not cover the photo-taking lens 25 and therefore, during the use of the camera, the cartridge chamber lid 37 can be reliably prevented from being opened by simple structure.

Accordingly, the error of the cartridge chamber lid 37 being opened by mistake during photographing to thereby expose film can be reliably prevented.

Also, in the above-described camera, the guide grooves 21d and 21e are formed straight in the upper surface 21b and lower surface 21c, respectively, of the camera body 21 and therefore, the sliding cover 31 can be reliably guided.

Further, the guide groove 37b of the cartridge chamber lid 37 is formed at a location on the extension of the guide groove 21e formed in the lower surface 21c of the camera body 21 (i.e., so as to be on a straight line) and therefore, during the use of the camera, the sliding cover 31 can be reliably guided by simple structure.

Also, the cartridge chamber lid 37 is formed with the guide groove 37b for guiding the sliding cover 31 and therefore, as compared with a case where a guide groove is formed aside the cartridge chamber lid 37, the thickness of the camera body 21 can be made small.

While the above first embodiment has been described with respect to an example in which the guide grooves 21d and 21e are formed in the upper surface 21b and lower surface 21c, respectively, of the camera body 21, the present invention is not restricted to such an embodiment, but for example, the guide groove 21e can be formed in the lower surface 21c of the camera body 21, and the other guide groove may be formed in the front face or the like of the camera body.

Also, while the above first embodiment has been described with respect to an example in which the guide grooves 21a, 21e and 37b are formed on the camera body 21 and cartridge chamber lid 37 and the guide convex portion 31c is formed on the sliding cover 31, the present invention is not restricted to such an embodiment, but for example, guide convex portions may be formed on the camera body and cartridge chamber lid and a guide groove may be formed on the sliding cover.

Figure 6:
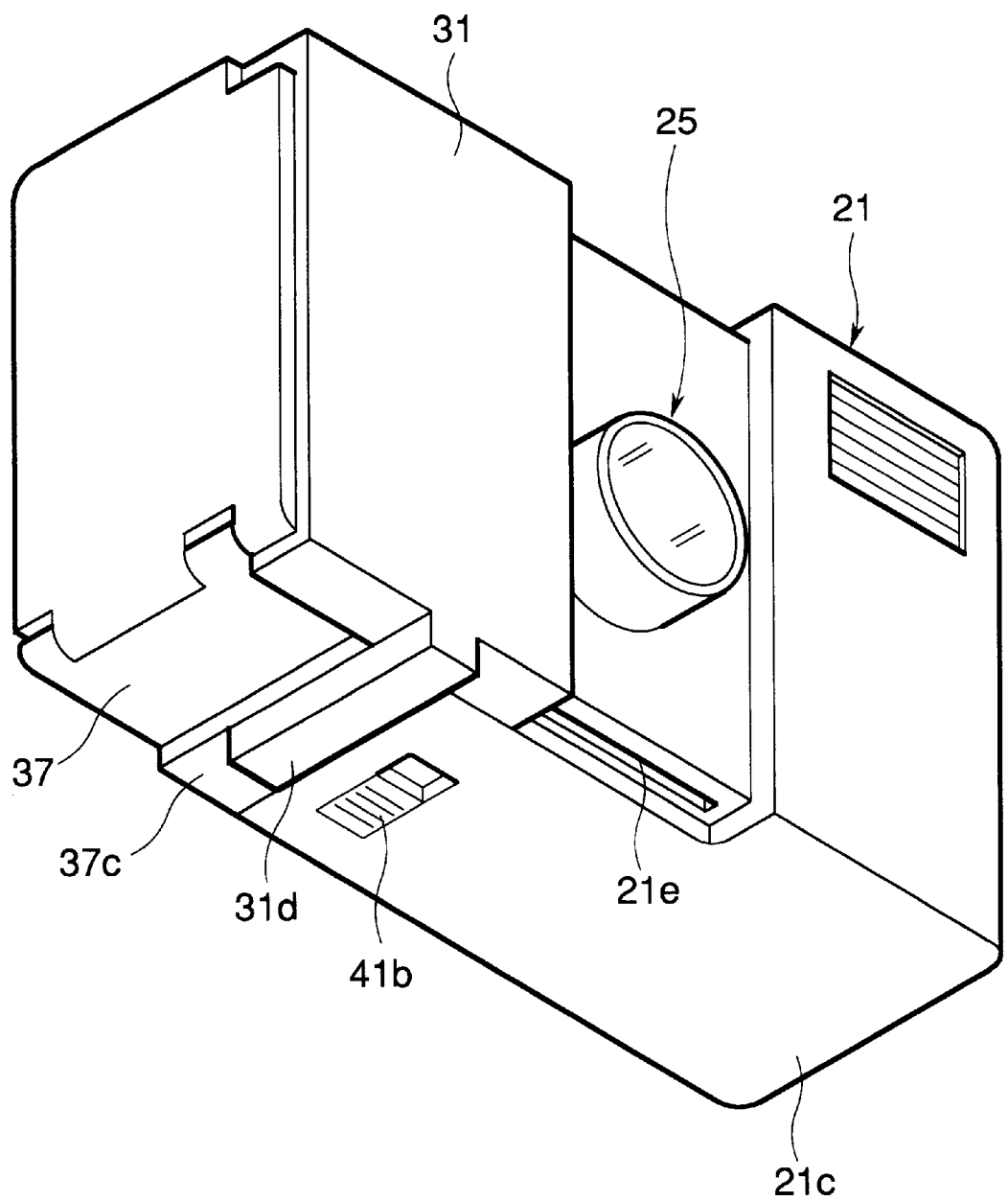
FIG. 6 is a perspective view showing a state in which a sliding cover is opened in a second embodiment of the camera of the present invention.
Figure 7:
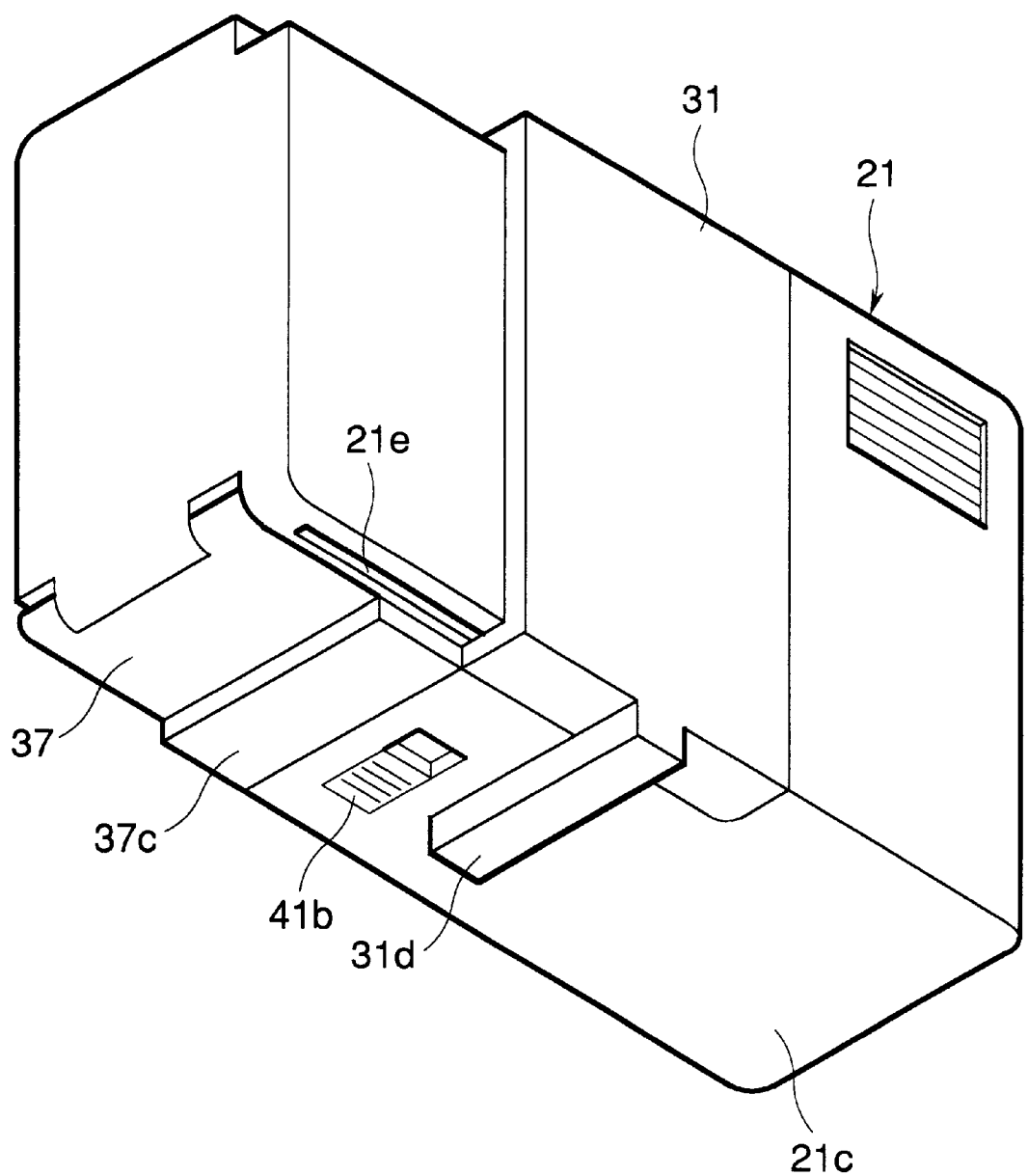
FIG. 7 is a perspective view showing a state in which the sliding cover is closed in the camera of FIG. 6.

FIGS. 6 and 7 show a second embodiment of the camera of the present invention, and in this embodiment, the cartridge chamber lid 37 is not formed with a guide groove, and a guide groove 21e extends in front of the cartridge chamber lid 37 on the lower surface 21c of the camera body 21.

An opening impeding portion 31d is integrally formed on the end portion of the sliding cover 31 so as to cover the fixed portion 37c of the cartridge chamber lid 37.

In this camera, as shown in FIG. 6, only when the sliding cover 31 is in the position in which it does not cover the photo-taking lens 25, the opening of the cartridge chamber lid 37 is impeded by the opening impeding portion 31d of the sliding cover 31.

In the above-described camera, the opening impeding portion 31d is integrally formed on the end portion of the sliding cover 31 so as to cover at least a portion of the cartridge chamber lid 37 and therefore, during the use of the camera, the cartridge chamber lid 37 can be reliably prevented from being opened by very simple structure.

Figure 8:
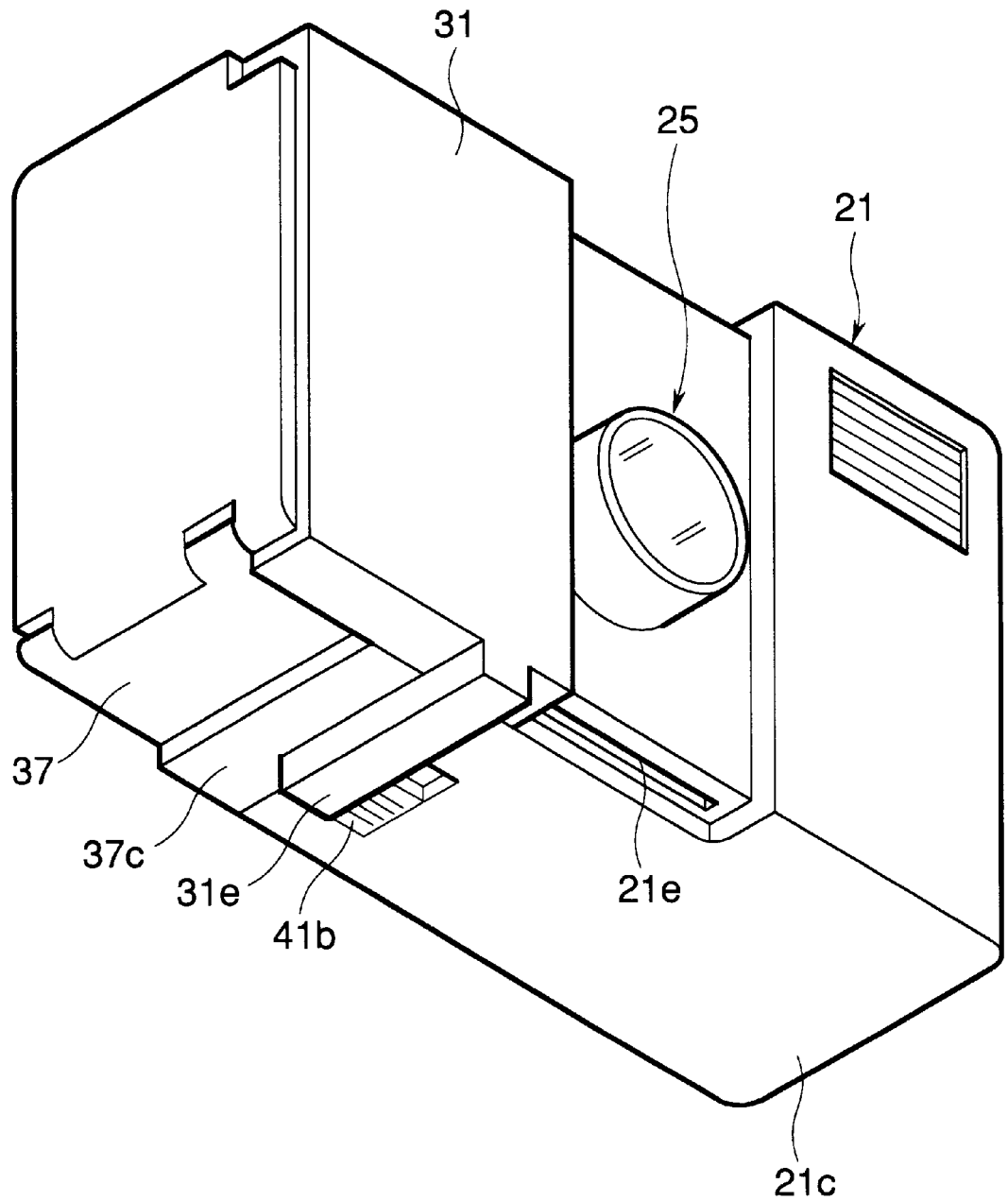
FIG. 8 is a perspective view showing a state in which a sliding cover is opened in a third embodiment of the camera of the present invention.
Figure 9:
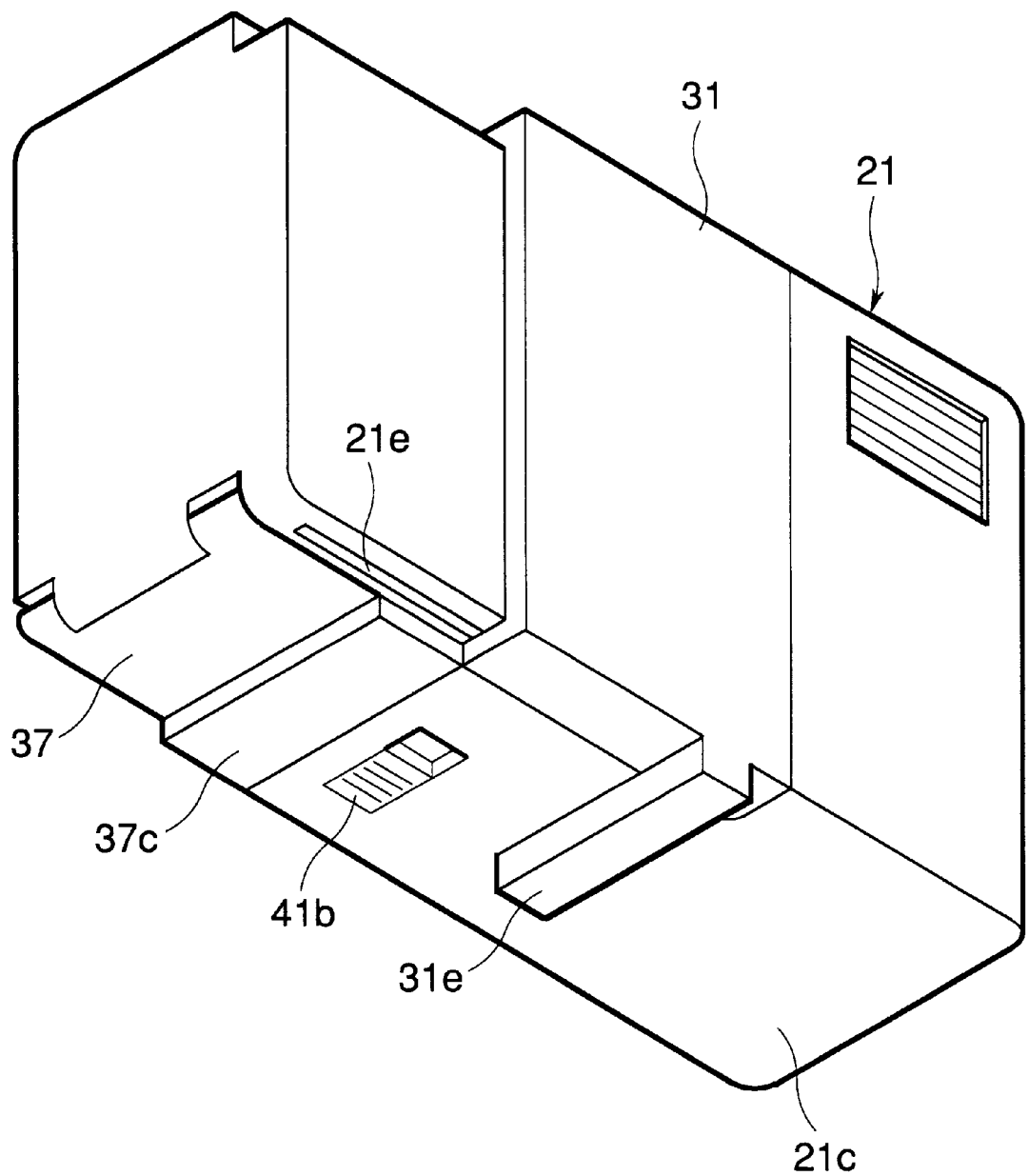
FIG. 9 is a perspective view showing a state in which the sliding cover is closed in the camera of FIG. 8.
Figure 10:
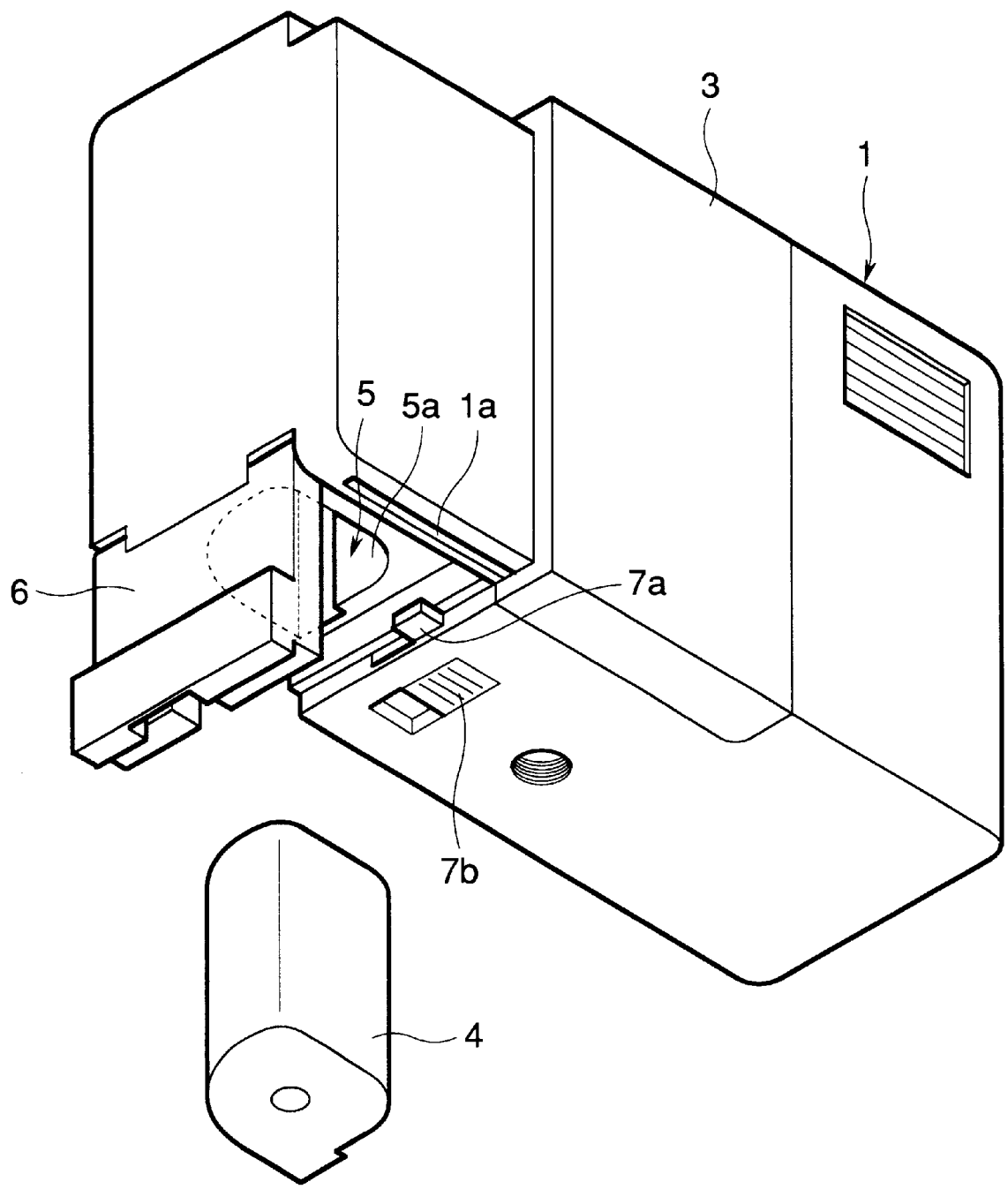
FIG. 10 is a perspective view showing a state in which a cartridge chamber lid is opened in a camera according to the prior art.
Figure 11:
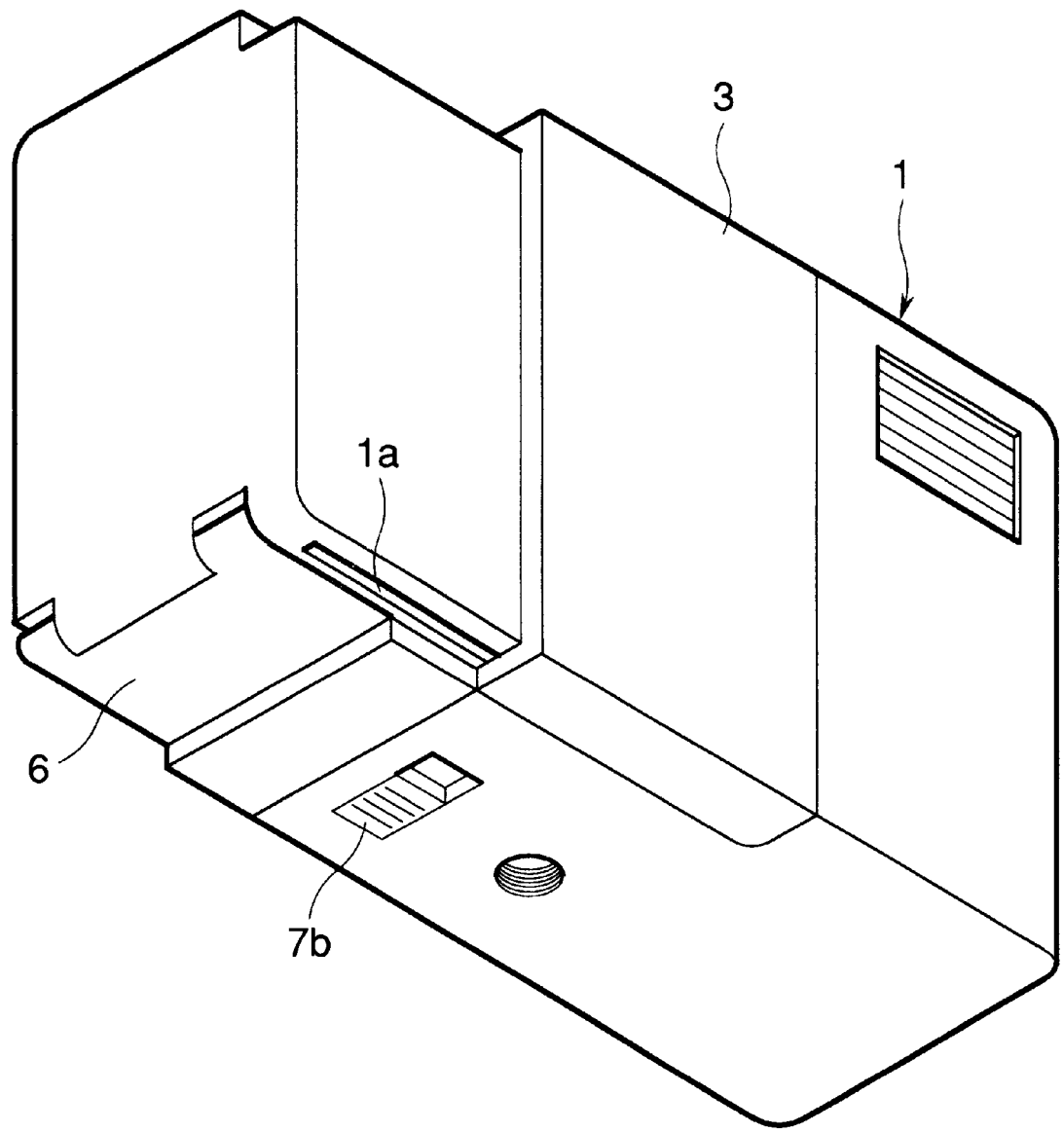
FIG. 11 is a perspective view showing a state in which a sliding cover is closed in the camera of FIG. 10.
Figure 12:
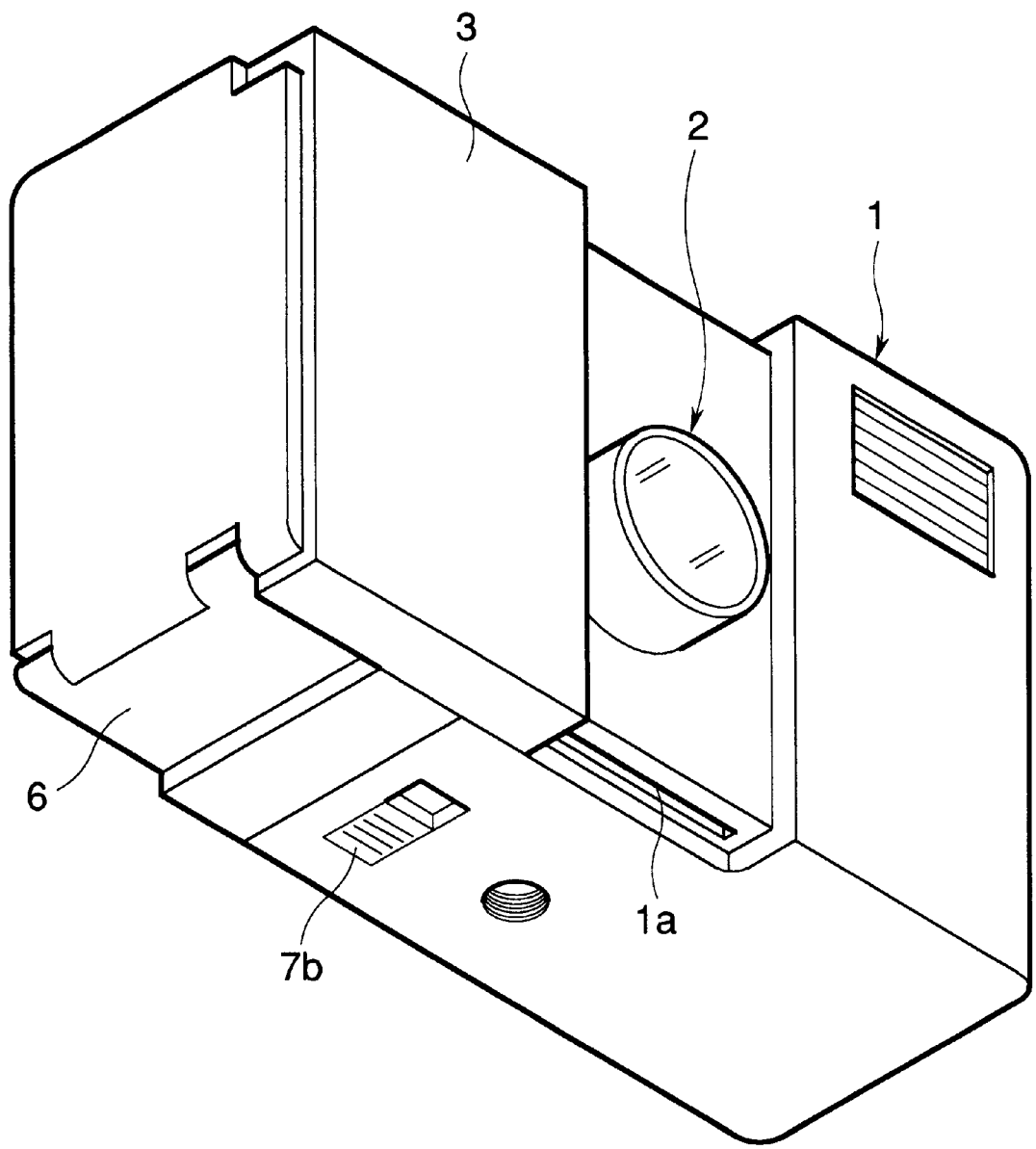
FIG. 12 is a perspective view showing a state in which the sliding cover is opened in the camera of FIG. 10.
Figure 13:
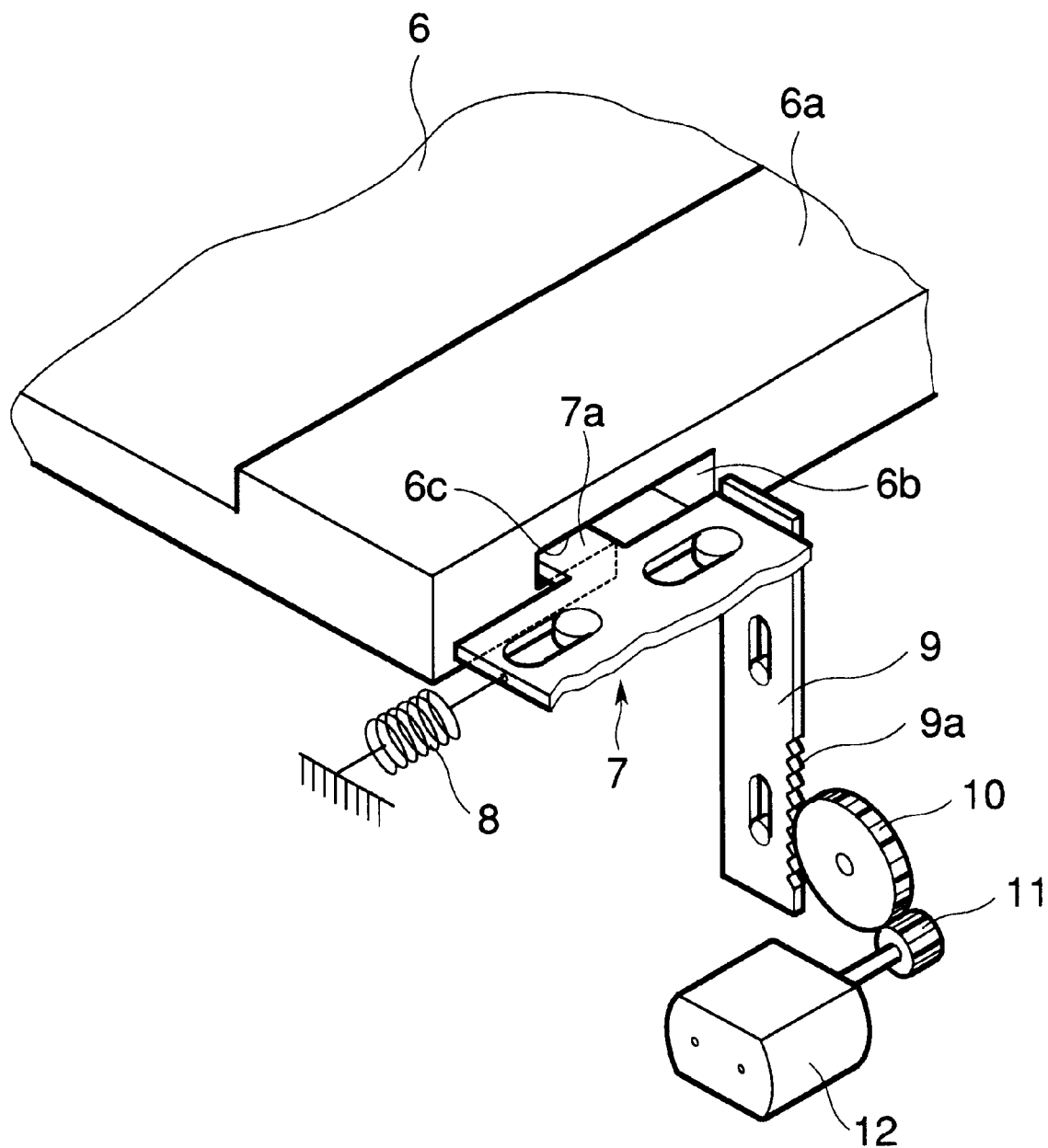
FIG. 13 is a perspective view schematically showing an opening-closing mechanism for the cartridge chamber lid of the camera of FIG. 10.

FIGS. 8 and 9 show a third embodiment of the camera of the present invention, and in this embodiment, as in the second embodiment, the cartridge chamber lid 37 is not formed with a guide groove, but a guide groove 21e extends in front of the cartridge chamber lid 37 on the lower surface 21c of the camera body 21.

An opening operation impeding portion 31e is integrally formed on the end portion of the sliding cover 31 so as to cover an operating member 41b.

In this camera, only when as shown in FIG. 8, the sliding cover 31 is in the position in which it does not cover the photo-taking lens 25, the opening operation of the operating member 41b is impeded by the opening operation impeding portion 31e of the sliding cover 31, whereby the opening of the cartridge chamber lid 37 is impeded.

In the above-described camera, the opening operation impeding portion 31e is integrally formed on the end portion of the sliding cover 31 so as to cover at least a portion of the operating member 41b and therefore, during the use of the camera, the cartridge chamber lid 37 can be reliably prevented from being opened by very simple structure.

While the above second and third embodiments have been described with respect to an example in which the camera body 21 is formed with the guide groove 21e to thereby guide the sliding cover 31, the present invention is not restricted to such embodiments, but the sliding cover may be guided by other guide mechanism.

While in the above embodiments, the cartridge chamber opens at the lower or bottom side of the camera body, the present invention is not restricted to such embodiments, but the cartridge chamber may open at the front side (i.e. the side on which the taking-lens is arranged) or the back side.

As described above, in the camera according to an embodiment of the present invention, the cartridge chamber lid is formed with a guide groove or a guide convex portion for guiding the sliding cover when the sliding cover is in the position in which it does not cover the photo-taking lens and therefore, during the use of the camera, the cartridge chamber lid can be reliably prevented from being opened by simple structure. Also, the cartridge chamber lid is formed with a guide groove or a guide convex portion for guiding the sliding cover and therefore, the thickness of the camera body can be made small. Also, guide grooves or guide convex portions are formed straight in the both sides of the camera body which are parallel to the direction of movement of the sliding cover and therefore, the sliding cover can be reliably guided.

Also, the guide groove or guide convex portion of the cartridge chamber lid is formed at a location on the extension of the guide groove or guide convex portion formed in that side of the camera body which is adjacent to the cartridge chamber lid and therefore, during the use of the camera, the sliding cover can be reliably guided by simple structure.

In the camera according to the second embodiment, the sliding cover is formed with an opening impeding portion for impeding the opening of the cartridge chamber lid when the sliding cover is in the position in which it does not cover the photo-taking lens and therefore, during the use of the camera, the cartridge chamber lid can be reliably prevented from being opened by simple structure. Also, the opening impeding portion is integrally formed on the end portion of the sliding cover so as to cover at least a portion of the cartridge chamber lid and therefore, during the use of the camera, the cartridge chamber lid can be reliably prevented from being opened by very simple structure.

In the camera according to the third embodiment, the sliding cover is formed with an opening operation impeding portion for impeding the opening operation of the operating member for effecting the opening and closing of the cartridge chamber lid when the sliding cover is in the position in which it does not cover the photo-taking lens and therefore, during the use of the camera, the cartridge chamber lid can be reliably prevented from being opened by simple structure. Also, the opening operation impeding portion is integrally formed on the end portion of the sliding cover so as to cover at least a portion of the operating member and therefore, during the use of the camera, the cartridge chamber lid can be reliably prevented from being opened by very simple structure.

What is claimed is:

1. A camera comprising:

a camera body;

a sliding cover disposed on the front face of the camera body and movable between a position in which it covers a photo-taking lens and a position in which it does not cover the photo-taking lens;

a film cartridge chamber which opens on a side of said camera body which is parallel to the direction of movement of said sliding cover and into and out of which a film cartridge is put through said opening; and a cartridge chamber lid for openably and closably covering the opening of the film cartridge chamber, said cartridge chamber lid having on its outer surface a guide structure for guiding said sliding cover when said sliding cover is in the position in which it does not cover said photo-taking lens.

2. The camera of claim 1, wherein said guide structure is one of a guide groove and a guide convex portion.

3. The camera of claim 2, wherein the two sides of said camera body which are parallel to the direction of movement of said sliding cover are formed with guide grooves or guide convex portions, and said guide groove or said guide convex portion formed on that one of said two sides which is provided with said cartridge chamber lid is on a straight line with respect to said guide groove or said guide convex portion on said cartridge chamber lid.

4. A camera comprising:

a camera body;

a sliding cover disposed on the front face of the camera body and movable between a position in which it covers a photo-taking lens and a position in which it does not cover the photo-taking lens;

a film cartridge chamber which opens on a side of said camera body which is parallel to the direction of movement of said sliding cover and into and out of which a film cartridge is put through said opening;

a cartridge chamber lid for openably and closably covering the opening in the film cartridge chamber; and an opening impeding portion provided on said sliding cover for impeding the opening of said cartridge chamber lid when said sliding cover is in the position in which it does not cover said photo-taking lens.

5. The camera of claim 4, wherein said opening impeding portion is integrally formed on the end portion of said sliding cover so as to cover at least a portion of said cartridge chamber lid.

6. A camera comprising:

a camera body;

a sliding cover disposed on the front face of the camera body and movable between a position in which it covers a photo-taking lens and a position in which it does not cover the photo-taking lens;

a film cartridge chamber which opens on a side of said camera body which is parallel to the direction of movement of said sliding cover and into and out of which a film cartridge is put through said opening;

a cartridge chamber lid for openably and closably covering the opening of the film cartridge chamber; and an opening operation impeding portion provided on said sliding cover for impeding the opening operation of an operating member for effecting the opening and closing of said cartridge chamber lid when said sliding cover is in the position in which it does not cover said photo-taking lens.

7. The camera of claim 6, wherein said opening operation impeding portion is integrally formed on the end portion of said sliding cover so as to cover at least a portion of said operating member.

* * * * *